United States Patent Office.

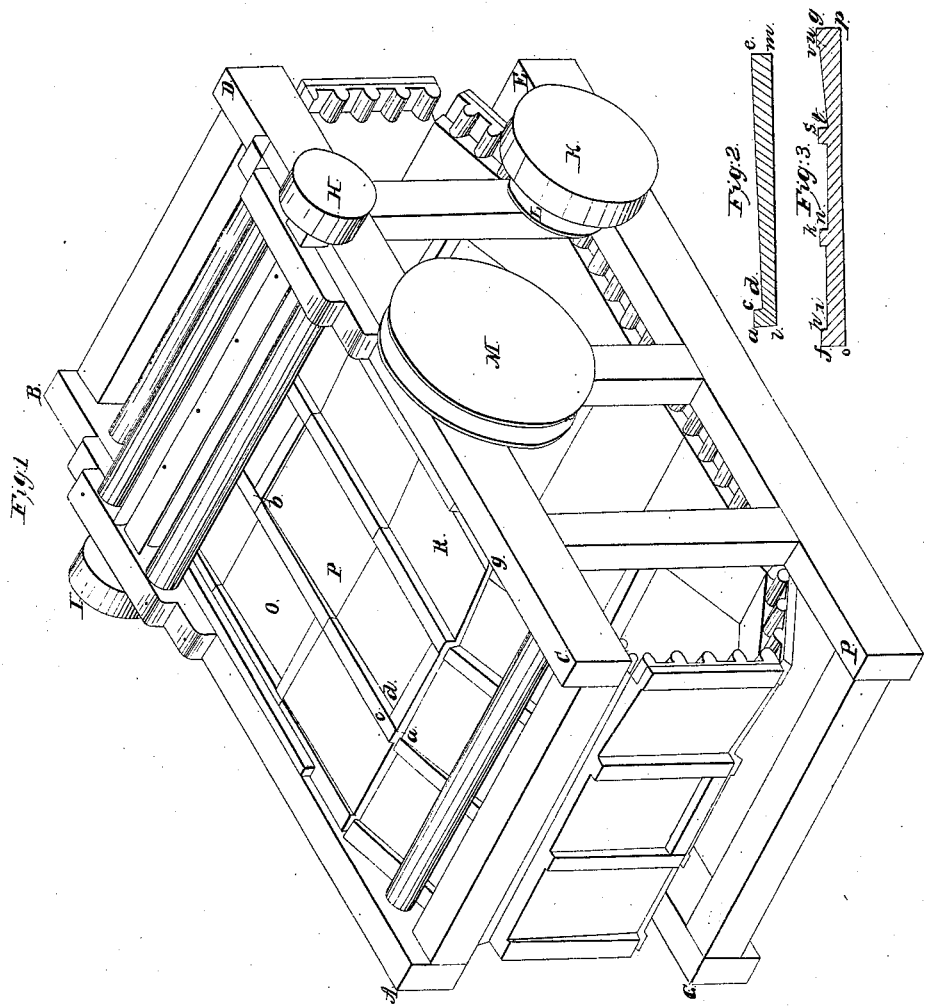

HORACE G. McDUFFE, OF BRADFORD, VERMONT.

Letters Patent No. 77,067, dated April 21, 1868; antedated April 18, 1868.

IMPROVEMENT IN PLANING-MACHINES.

*The Schedule referred to in these Letters Patent and making part of the same.*

TO ALL WHOM IT MAY CONCERN:

Be it known that I, HORACE G. McDUFFE, of Bradford, in the county of Orange, and State of Vermont, have invented a new and improved Machine for Planing Shingles, Clapboards, &c.; and I do hereby declare the following to be a full, clear, and exact description of the same, reference being had to the accompanying drawings forming part of this specification, and in which—

Figure 1 is a perspective view of my invention.

Figure 2 is a longitudinal section of the shingle-beds O P, and

Figure 3 is a cross-section of the shingle-beds and the clapboard-bed R.

The subject of this invention is the machine for planing shingles, clapboards, &c., in which an endless-apron carrier is used.

My invention consists in employing a series of beds on the surface of the carrier, which hold, guide, and govern the shaping and bevel of the shingles or clapboards as they pass under the planer.

Similar letters of reference indicate corresponding parts in the several figures.

In the drawings, A B C D E F G Y Y Y indicate the several parts of the frame of the machine, T being the endless apron, composed of rectangular plates or sections, united by hinges along their inner edges, and running on hexagonal rollers inside of the frame, and not seen in the drawings. X is the planer, and Z Z are the guide-rollers, working above the apron T. The whole machine is operated by power applied at the pulley I on the planer-shaft, and thence carried by a belt from the opposite end, H, of the shaft, to a pulley, L, and thence to a pulley, M, the shaft of which drives the apron T by a cog-gear, $t\,t\,t$.

The upper or outer surface of the apron I divide by longitudinal and transverse ribs $r\,r\,r$, so as to form rectangular beds or depressions on the surface of the apron between the ribs, to receive and hold the shingles, clapboard, &c., and carry them under the planer. The beds are of the size of the shingles or clapboards to be sawed. Those designed for shingles are deep at one end, as at $d$, figs. 1 and 2, and shallow at the opposite end, as shown at $e$. Those designed for the clapboards are deep on one side and shallow on the other, as shown at $t'\,u$, fig. 3, the ends being of equal depth and dimensions. The shingle or clapboard is placed in its bed, fitting closely down to the bottom of it, and in that position is carried by the apron under the planer, which passes horizontally over it, cutting it down to the level of the top of the ribs $r\,r$, or thereabout, and leaving the shingle or clapboard shaped like the bed in which it lay. As the apron emerges from beneath the planer and guide-rollers and passes over the wheel at the end of the machine, it drops the shingles, and the beds are ready, when they arrive at the top of the machine, again to receive a new supply of shingles.

It is evident that beds or depressions such as are above described, and for the purpose above set forth, may be used as well upon a carrier which has not the motion of an endless apron, but moves back and forth under the planer, as upon the apron above described. I do not wish to limit myself to their use in connection with the endless-apron form of carriage, but What I do claim as new, and desire to secure by Letters Patent, is—

In a planing-machine, as above described, a carrier, having its upper or outer surface formed into a series of beds or depressions, O P R, in shape the same as the shingle or clapboard to be planed, when constructed and operating in combination with the planer X, substantially as and for the purpose set forth.

HORACE G. McDUFFE.

Witnesses:
 CHAS. H. HARDING,
 REUBEN J. GAFFIELD.